United States Patent Office 3,263,582
Patented August 2, 1966

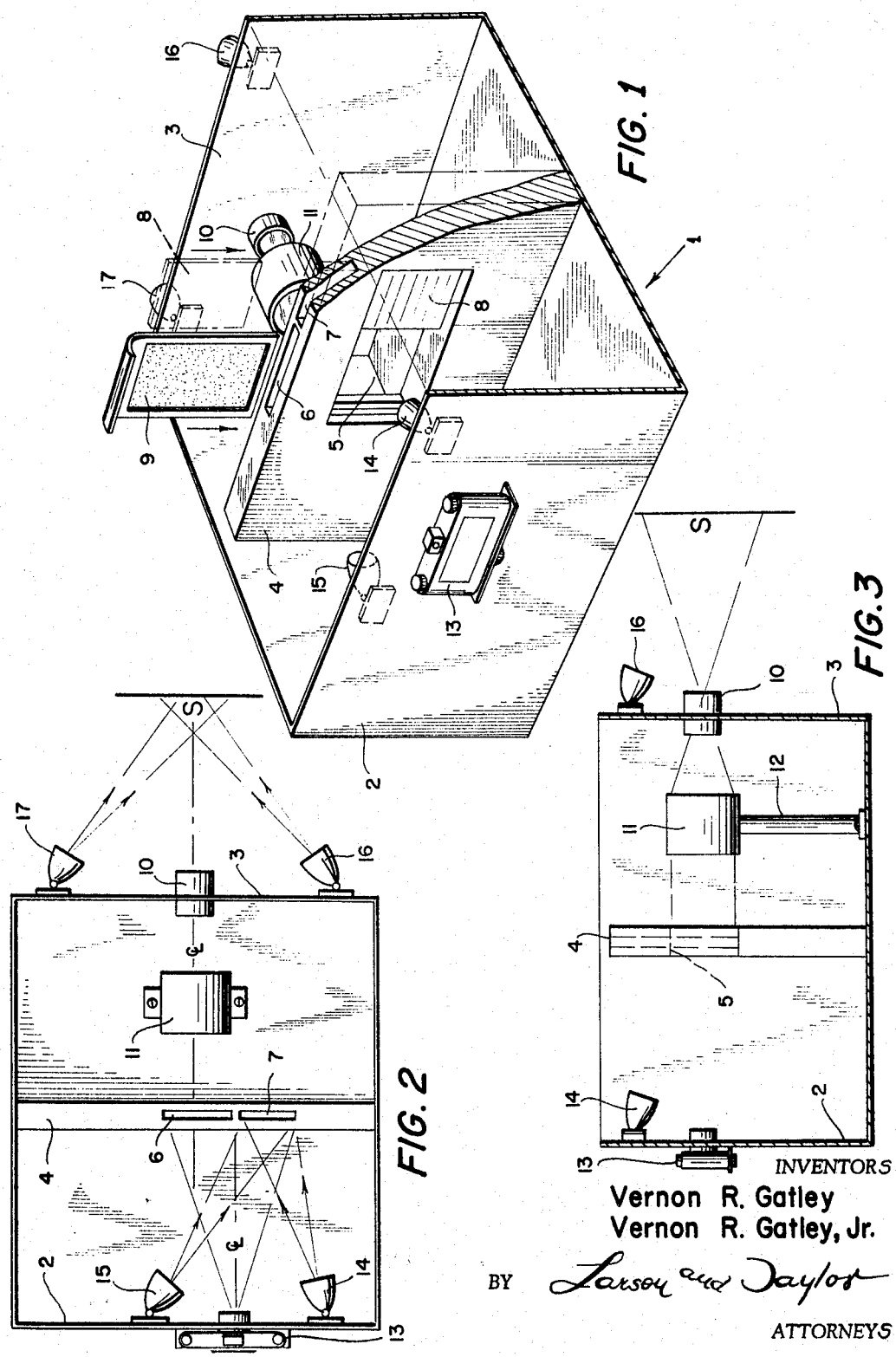

3,263,582
PHOTOGRAPHIC IDENTIFICATION APPARATUS
Vernon R. Gatley, 721 NE. 8th St., and Vernon R. Gatley, Jr., 621 NE. 8th St., both of Pompano Beach, Fla.
Filed Dec. 26, 1963, Ser. No. 333,364
1 Claim. (Cl. 95—1.1)

This invention relates to a photographic apparatus and more particularly to a device which facilitates simultaneously photographing two objects located at different distances from the camera.

It is frequently desirable to simultaneously photograph two objects which are located at different distances from a camera, reducing the image size of one object and providing means so that a photograph is made of a reduced image and objects both in focus in a single plane. For example, in providing cameras for photographing identification cards, means must be provided to simultaneously photograph the subject and the pertinent information relative to that subject wherein both the subject and data appear on a card in proper focus. Prior art cameras for this purpose have not satisfactorily solved the problem in that either the photograph is of such a small size that the features of the individual are not readily discernable or the data appearing on the card is not of a size and character that it may be clearly seen.

The present invention provides a simple solution to the aforementioned problems by providing an apparatus which may be used in connection with any type of existing camera and which will render such camera suitable for simultaneously photographing objects in two different planes in the production of, for example, identification cards. According to the present invention there is provided a frame having a central partition therein. This frame has a partition centrally located therein and in this partition there is an enlarged aperture. In approximately one half of this aperture the data to be photographed is inserted. In the other half of this aperture the image of the subject to be photographed is formed. This image, which is apparent if a ground glass is inserted in the aperture, is formed by a lens system located in the frame on one side of the partition. This lens system includes a focusing lens and a pair of lenses forming a condenser. The condenser lens may be comprised of two tandem plano-convex lenses in plano, convex-convex, plano relationship. The image of the subject is actually condensed to the proper size to fit within the aperture and is focussed at that point. On the other side of the partition mounted within the frame is a camera of any well known type. Means is provided to simultaneously illuminate the data appearing on the card to be photographed and for illuminating the subject to be photographed. In order to produce an identification card the name, address and other pertinent information relative to the individual is typed on a card and inserted in the aperture in the central partition. The subject is positioned and ground glass may be inserted in the aperture so as to make the image therein apparent to ensure proper focus. The ground glass is then removed and the camera shutter tripped. The resulting photograph will incorporate both the data and the picture of the subject in a single photograph in which the features of the subject are of a size to provide for easy recognition and the data is in proper focus and is clearly visible.

An object of the present invention is to provide an apparatus which permits the simultaneous photographing of objects disposed in spaced planes with both objects being photographed in focus.

Another object of the present invention is to provide an apparatus for attachment to a camera which will permit the formation of identification cards bearing the photograph of the individual and data relative to the individual, the size of the subject's picture being sufficient to provide for easy recognition.

Other objects and many of the attendant advantages of the present invention will become more readily apparent upon consideration of the following detailed specification in connection with the accompanying drawing wherein:

FIG. 1 is a perspective view, with parts broken away, of the novel apparatus according to the present invention,
FIG. 2 is a top plan view of the apparatus shown in FIG. 1 and
FIG. 3 is a side elevational view thereof.

Referring now more specifically to the drawing wherein like numerals indicate like parts throughout the several views there is shown at 1 in FIG. 1 a frame including end walls 2 and 3 and central partition 4. This frame may be of any suitable design and construction as it performs no function other than as a support for the various elements of the system. Most conveniently, however, it may be formed as an open topped box so as to provide for ready access to the structural elements of the apparatus.

The partition 4 has a central aperture 5, this aperture having a pair of slots 6 and 7 to provide for communication between the central aperture and the upper edge of the partition. A card 8 bearing any desired indicia thereon may be inserted through slot 7 into approximately one half of the aperture 5. There is provided a ground glass plate 9 which may be inserted into the other portion of the aperture 5 through the slot 6.

A focusing lens 10 is mounted in the wall 3 and a group of lenses, such as two tandem plano-convex lenses, forming a condenser 11 is mounted on a support 12 between the wall 3 and partition 4. The focusing lens 10 and the condenser lenses 11 are of a type such that the image of a subject S is formed in the central aperture 5 in partition 4. By insertion of the ground glass plate 9 into the aperture 5 the image formed by lenses 10 and 11 may be focused so that both the image and the data on card 8 will be in proper focus for the camera.

A camera 13 of any suitable type is mounted on the wall 2 of the frame so that the lens of the camera passes through an opening in the wall 2. This camera is adapted to simultaneously photograph the data appearing on card 8 and the image of the subject S which appears in the other portion of the central aperture 5. Lighting means 14, 15, 16 and 17 are provided for simultaneously illuminating both the card 8 and the subject S.

It can be seen that the apparatus according to the present invention may be used in a wide variety of combinations to achieve various objectives. In the specific embodiment described the apparatus is used to produce identification cards wherein the data relative to the individual is placed on a card 8 and inserted in a portion of the aperture 5 and an image of a subject S is formed in the other portion of the aperture 5 by the lens combination 10 and 11. The camera 13 has the center line thereof disposed at the center of the aperture 5 and the camera will thus photograph the image of the subject S and the card 8. However, data or indicia could be located at the point where the subject S is disposed and further indicia could be disposed on card 8. The system may be used to compare the data on the card 8 with the indicia disposed at S or the system could be used to provide suitable identification for documents, the document being disposed at the location of the subject S and the identifying data disposed on card 8. It is further apparent that by changing the lens combination 10 and 11 any suitable magnification or condensation of the subject S may be achieved.

It is further possible according to the present invention to replace the camera shown at 13 with any suitable data recording means such as, for example, electromagnetic systems including xerography and magnetic tape.

Obviously many modifications and variations of the present invention are possible in light of the above teachings. What is claimed is new and desired to be secured by Letters Patent is:

A self-contained identification device for simultaneously photographing an image of a person and a card, said identification device comprising a frame, means mounted on said frame for supporting in a given plane a card bearing indicia relative to a person to be photographed, said supporting means comprising a partition having one aperture for supporting said card and a second aperture for supporting a viewing screen when desired, focussing lens means and condensing lens means mounted on said frame on one side of said plane and in spaced relationship with each other and with said plane for focussing substantially at said plane an image of said person being photographed, and camera means mounted on said frame on the other side of said plane and spaced therefrom and focussed at said plane for simultaneously photographing said card and the focussed image of said person at said plane on film in said camera means.

References Cited by the Examiner
UNITED STATES PATENTS

| | | | |
|---|---|---|---|
| 533,325 | 1/1895 | Stevens | 95—12 X |
| 2,174,931 | 10/1939 | Terry et al. | 352—51 |
| 2,257,676 | 9/1941 | Gance | 88—24 |
| 2,827,832 | 3/1958 | Patterson | 88—24 |

JOHN M. HORAN, *Primary Examiner.*